US010186937B2

(12) United States Patent
Osawa et al.

(10) Patent No.: US 10,186,937 B2
(45) Date of Patent: Jan. 22, 2019

(54) METHOD OF MANUFACTURING COMMUTATOR SEGMENTS WITH CLAWS AND TILTED RECESSES

(71) Applicant: ASMO CO., LTD., Shizuoka-ken (JP)

(72) Inventors: Toshiyuki Osawa, Kosai (JP); Kouji Hyoudou, Tahara (JP); Ryohei Kageyama, Hamamatsu (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 15/865,071

(22) Filed: Jan. 8, 2018

(65) Prior Publication Data

US 2018/0131257 A1 May 10, 2018

Related U.S. Application Data

(63) Continuation of application No. 14/029,611, filed on Sep. 17, 2013, now abandoned.

(30) Foreign Application Priority Data

Sep. 21, 2012 (JP) ................. 2012-208070
Sep. 21, 2012 (JP) ................. 2012-208071
Aug. 30, 2013 (JP) ................. 2013-179492

(51) Int. Cl.
*H02K 13/04* (2006.01)
*H01R 39/04* (2006.01)
(Continued)

(52) U.S. Cl.
CPC .......... *H02K 13/006* (2013.01); *H01R 39/04* (2013.01); *H02K 13/04* (2013.01); *H01R 43/08* (2013.01)

(58) Field of Classification Search
CPC ...... H02K 13/04; H02K 13/006; H02K 13/08; H02K 13/10; H02K 13/00; H02K 13/105;
(Continued)

(56) References Cited

U.S. PATENT DOCUMENTS 2,477,455 A  7/1949 Hinchliff
2,898,488 A  8/1959 Boyer
(Continued)

FOREIGN PATENT DOCUMENTS

JP  S57-141674 U  9/1982
JP  S58-22071 U   2/1983
(Continued)

OTHER PUBLICATIONS

Tsuruta Tadatoshi, Phenolic Resin Molding Composition for Production of Commutator, Sep. 2003, JP 2003-268296 (English Machine Translation).*

(Continued)

*Primary Examiner* — Bernard Rojas
*Assistant Examiner* — Alexander A Singh
(74) *Attorney, Agent, or Firm* — Christensen, Fonder, Dardi & Herbert PLLC

(57) ABSTRACT

A commutator includes a cylindrical insulator and commutator pieces, which are formed on the outer circumferential surface of the insulator and arranged side by side in the circumferential direction of the insulator. The commutator pieces are each composed of a conductive plate material, and each includes a connection claw and an engagement claw. The connection claw extends outward in the radial direction of the insulator while being configured to electrically being connected to an armature coil. The engagement claw extends inward in the radial direction of the insulator and engages with the insulator. The commutator pieces each include a (Continued)

recess portion with an undercut formed in a surface facing inward in the radial direction of the insulator.

3 Claims, 16 Drawing Sheets

(51) Int. Cl.
*H02K 13/00* (2006.01)
*H01R 43/08* (2006.01)

(58) Field of Classification Search
CPC ........ H02K 13/12; H02K 13/14; H01R 39/04; H01R 43/06
USPC ........... 310/233, 234, 235, 236, 237; 29/597
See application file for complete search history.

(56) References Cited

U.S. PATENT DOCUMENTS

| | | | |
|---|---|---|---|
| 3,492,519 A | | 1/1970 | Kirkwood et al. |
| 5,204,574 A | | 4/1993 | Kanno et al. |
| 5,491,373 A | * | 2/1996 | Cooper ................. H01R 39/04 |
| | | | 310/233 |
| 6,369,484 B1 | | 4/2002 | Kageyama et al. |
| 6,489,703 B2 | | 12/2002 | Terada et al. |
| 7,009,323 B1 | | 3/2006 | Simofi-Ilyes et al. |
| 7,084,546 B2 | | 8/2006 | Kageyama et al. |
| 2003/0193261 A1 | | 10/2003 | Ambrose et al. |
| 2004/0066110 A1 | * | 4/2004 | Kageyama ............. H01R 39/04 |
| | | | 310/233 |
| 2008/0066293 A1 | | 3/2008 | Osawa et al. |

FOREIGN PATENT DOCUMENTS

| | | |
|---|---|---|
| JP | S59-114761 | 8/1984 |
| JP | S60-11657 U | 1/1985 |
| JP | S61-202163 U | 12/1986 |
| JP | S64-2568 | 1/1989 |
| JP | 08-308182 | 11/1996 |
| JP | 2000-152566 | 5/2000 |
| JP | 2001-245457 | 9/2001 |
| JP | 2002-051506 A | 2/2002 |
| JP | 2003268196 A * | 9/2003 |
| JP | 2004-147495 A | 5/2004 |
| JP | 2008-072874 A | 3/2008 |

OTHER PUBLICATIONS

Kenichi, Sugiyama, "Commutator for Small-Sized Motor and its Manufacture," Nov. 22, 1996, JP-830882 (13 pgs.).

Sakurai, Yoshihisa, "A Commutator," Tokyo Electric, JP S57-141674, English Translation, Sep. 1982 (20 pgs.).

* cited by examiner

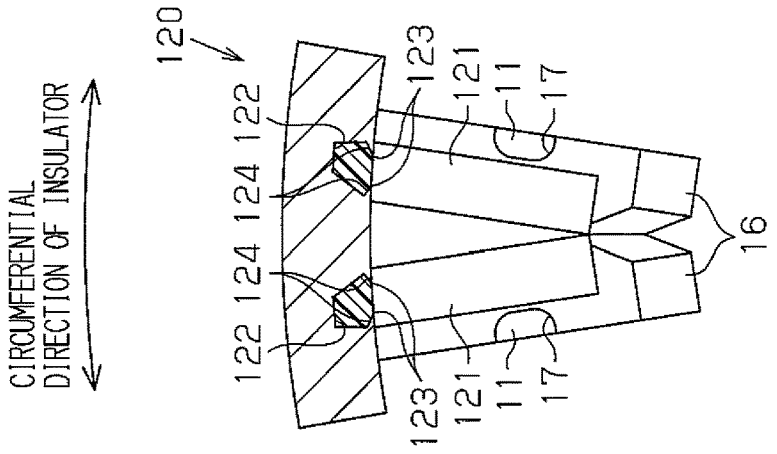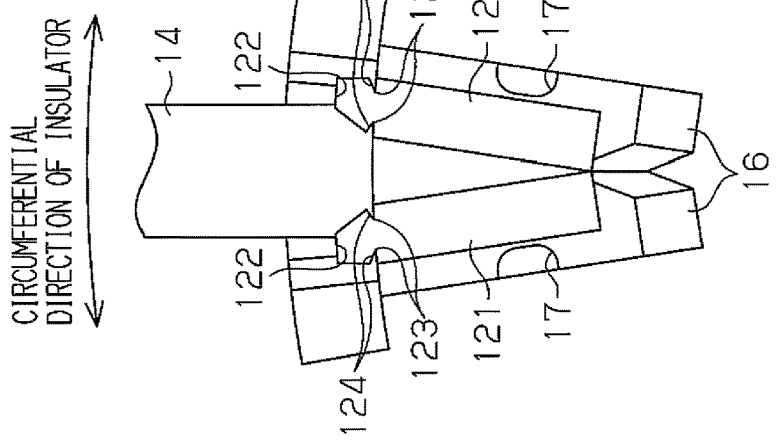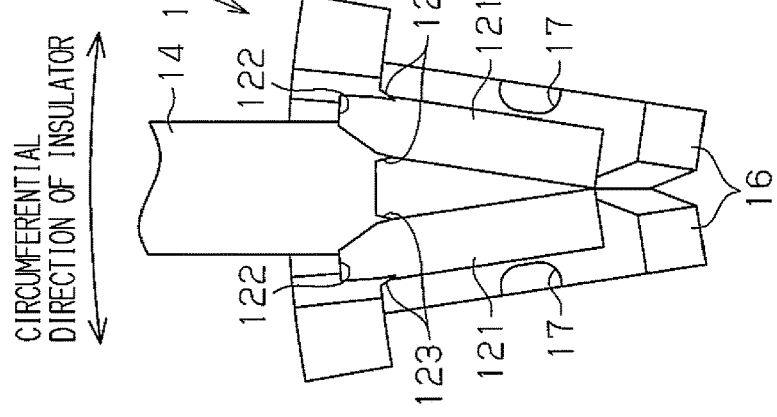

METHOD OF MANUFACTURING COMMUTATOR SEGMENTS WITH CLAWS AND TILTED RECESSES

CROSS-REFERENCE TO RELATED APPLICATIONS

The present application is a continuation application of U.S. patent application Ser. No. 14/029,611, filed Sep. 17, 2013, which claims priority to Japanese Patent Application No. 2012-208070, filed Sep. 21, 2012, Japanese Patent Application No. 2012-208071, filed Sep. 21, 2012, and Japanese Patent Application No. 2013-179492, filed Aug. 30, 2013, the disclosures of which are hereby incorporated by reference herein in their entireties.

BACKGROUND OF THE INVENTION

The present invention relates to a commutator.

A commutator for a DC motor includes a cylindrical insulator fixed to a rotary shaft of an armature, and multiple conductive segments attached to the outer circumferential surface of the insulator. Each segment has a riser connected to an end of a coil wound around a core of the armature. Feeding brushes are in sliding contact with the outer circumferential surfaces of the segments. The feeding brushes feed a direct current to the coil of the armature via the segments.

The aforementioned commutator is manufactured as follows. A cylindrical conductive material is placed in a die and a plastic material is poured into the cylindrical material, thereby forming the aforementioned insulator. Then, the cylindrical material is cut along the axis to form the aforementioned segments.

Japanese Laid-Open Patent Publication No. 2002-51506 discloses such a commutator. According to Japanese Laid-Open Patent Publication No. 2002-51506, in order to ensure force of engagement between the insulator and each segment, a surface of the segment contacting the insulator is roughened by being dipped in a roughening liquid to become a roughened surface of a structure with tiny recesses and projections. This roughened surface increases the area of engagement between the segment and the insulator, compared to the case where the aforementioned surface of the segment is smooth without a structure with recesses and projections, thereby increasing the force of engagement there between.

The aforementioned segment of the commutator should be subjected to aftertreatment after formation of the roughened surface, such as removal of the roughening liquid existing on the roughened surface. In the absence of this aftertreatment, the roughened surface is continuously roughened. This changes the structure with recesses and projections for example, leading to reduction of the force of engagement between the segment and the insulator. Hence, manufacture of the commutator involves a large number of steps.

SUMMARY OF THE INVENTION

It is an objective of the present invention to provide a commutator that provides a high engagement force between segments and an insulator and requires a small number of manufacturing of steps.

To achieve the foregoing objective and in accordance with one aspect of the present invention, a commutator is provided. The commutator includes a cylindrical insulator and a plurality of commutator pieces formed on an outer circumferential surface of the insulator. The commutator pieces are arranged side by side in a circumferential direction of the insulator. The commutator pieces are each composed of a conductive plate material. The commutator pieces each include a connection claw, which extends outward in a radial direction of the insulator and is configured to be electrically connected to an armature coil, and an engagement claw extending inward in the radial direction of the insulator. The engagement claw engages with the insulator. The commutator pieces each include a recess portion with an undercut formed in a surface facing inward in the radial direction of the insulator.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 19 is a top view of the cylindrical material of FIG. 17A as seen in the axial direction;

FIG. 20 is a top view of the cylindrical material of FIG. 18A as seen in the axial direction;

FIG. 21 is a cross-sectional view of the cylindrical material of FIG. 18A as seen in the axial direction;

DESCRIPTION OF THE PREFERRED EMBODIMENTS

First Embodiment

A first embodiment according to the present invention will be described below based on FIGS. 1 to 7.

Figure 1:
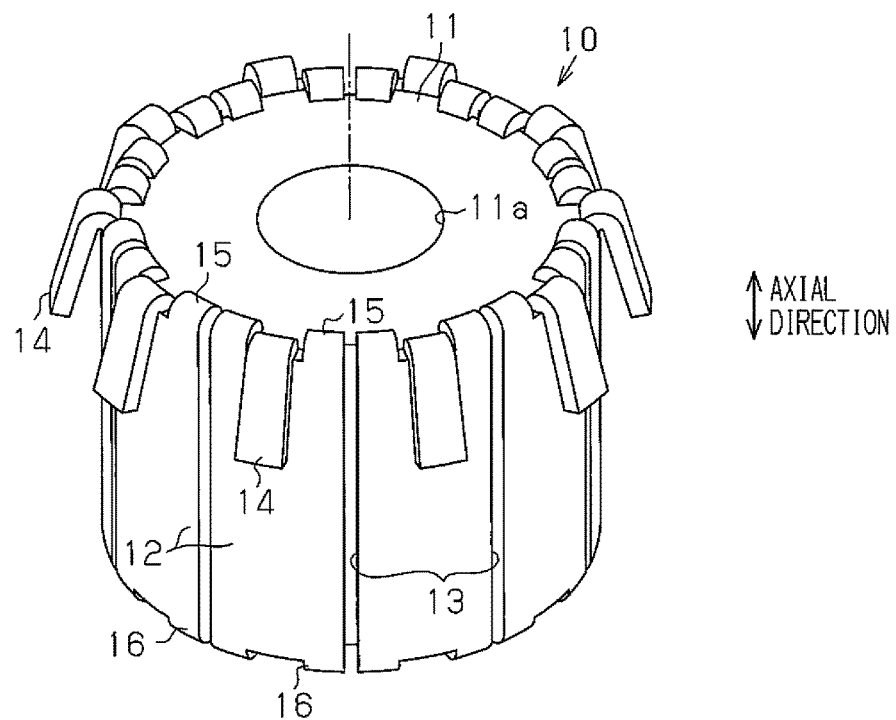
FIG. 1 is a perspective view showing a commutator of a first embodiment.

As shown in FIG. 1, a commutator 10 includes a cylindrical insulator 11 made of a thermosetting plastic, and ten segments 12 (commutator pieces) fixed to the outer circumferential surface of the insulator 11. A press-fitting hole 11a extending through the insulator 11 in the axial direction is formed at a radial central portion of the insulator 11. A rotary shaft of an armature (not shown) is press-fitted in the press-fitting hole 11a. Accordingly, the commutator 10 rotates integrally with the rotary shaft of the armature.

Each segment 12 is formed from a conductive plate material (for example, a metal plate such as a copper plate). The ten segments 12 are strips extending in the axial direction of the insulator 11 while being uniformly spaced angularly in the circumferential direction of the insulator 11. A partition groove 13 extending in the axial direction of the insulator 11 is formed between adjacent segments 12. Specifically, the adjacent segments 12 are spaced from each other by the partition groove 13. This electrically isolates the ten segments 12 from each other. Each partition groove 13 is formed inward in the radial direction to a depth greater than the thickness of each segment 12 (length thereof in the radial direction of the insulator 11). The depth of each partition groove 13 in the radial direction is greater than the thickness of each segment 12. Each partition groove 13 is formed to reach the insulator 11.

A riser 14 is provided at a first end (upper end of FIG. 1) of each segment 12 in the axial direction. At its proximal end, the riser 14 is bent outward in the radial direction of the insulator 11. The riser 14 faces the radially outer surface of the segment 12. The riser 14 is connected to an armature coil of an armature (not shown). Specifically, the riser 14 corresponds to a connection claw.

Figure 7:
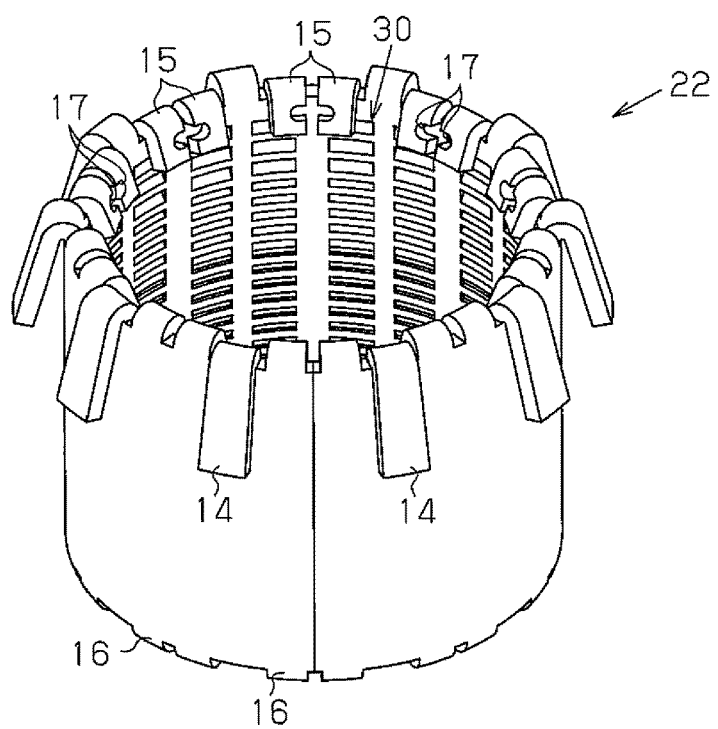
FIG. 7 is a perspective view showing a condition where risers and inner claws of the cylindrical material of FIG. 6 are bent.

Two first inner claws 15 are provided at an end of each segment 12 closer to the riser 14, specifically at the first end. The two first inner claws 15 sandwich the riser 14 there between. Two second inner claws 16 are provided at a second end of each segment 12 opposite the first end in the axial direction. Each of the two second inner claws 16 is arranged at a position to form a pair with the corresponding one of the two first inner claws 15 in the longitudinal direction of the segment 12. The first and second inner claws 15 and 16 are bent toward a side of the radial direction opposite the side of the bending of the riser 14, specifically they are bent inward in the radial direction of the insulator 11 at their proximal ends. The distal ends of the first and second inner claws 15 and 16 face the radially inner surface of the segment 12. The distal ends of the first and second inner claws 15 and 16 are buried in the insulator 11. This couples each segment 12 to the insulator 11. The first and second inner claws 15 and 16 correspond to engagement claws. As shown in FIG. 7, each of the first and second inner claws 15 and 16 has a cutout 17 formed at a lateral part thereof to open toward the adjacent segment 12.

Figure 2:
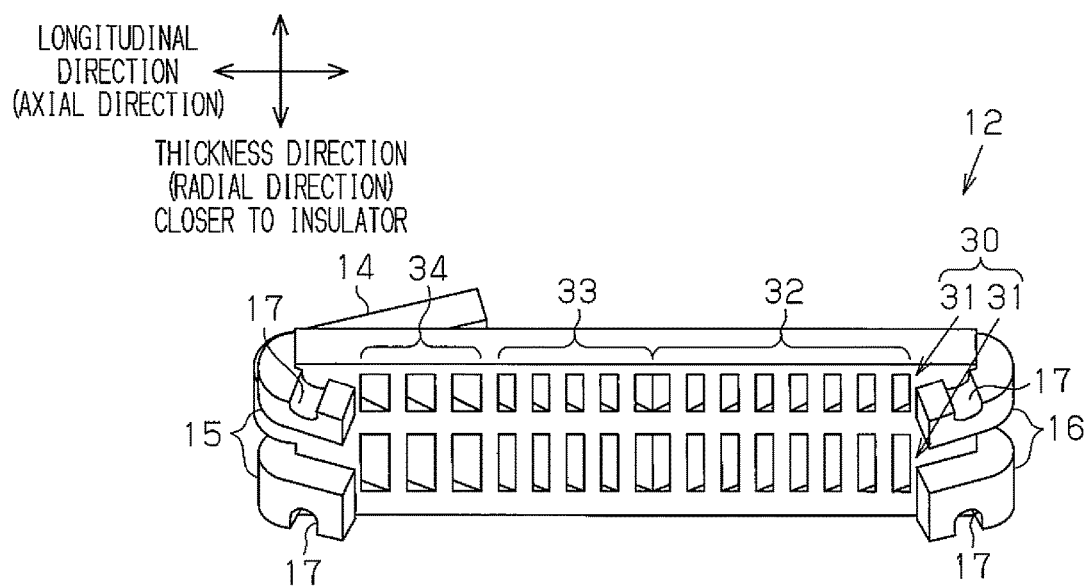
FIG. 2 is a perspective view showing a segment material of the commutator of FIG. 1.
Figure 3A:
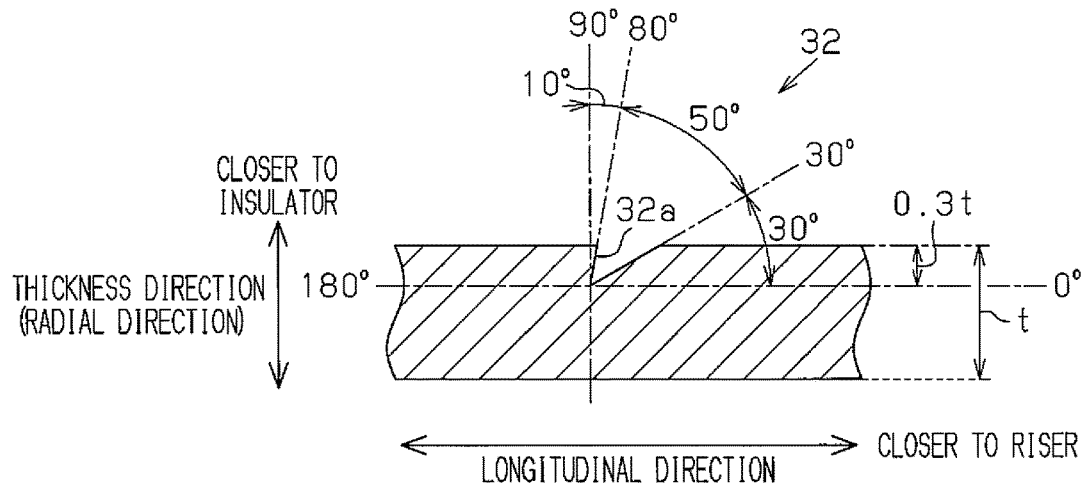
FIGS. 3A to 3C are cross-sectional views showing a first recess, a second recess, and a third recess respectively formed in the segment of FIG. 2.
Figure 3B:
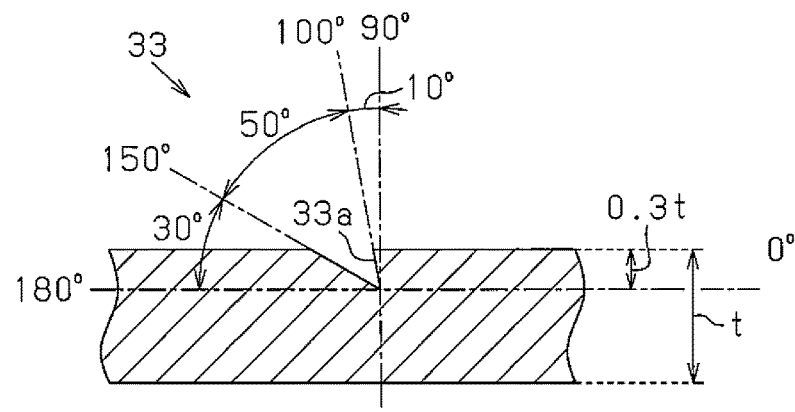
Figure 3C:
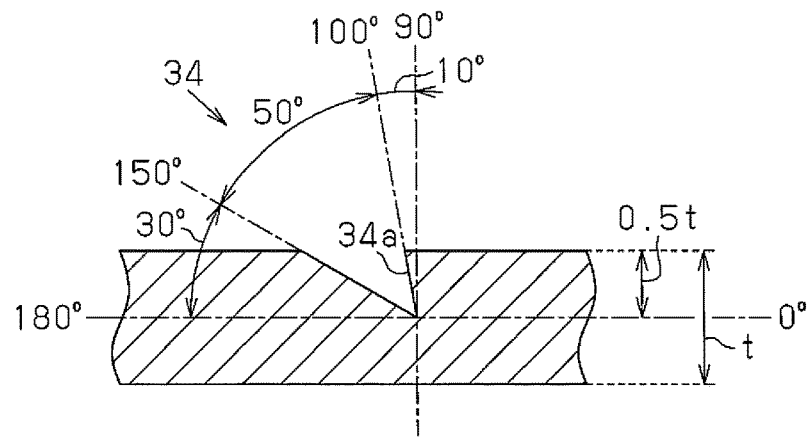

As shown in FIG. 2, a recess portion 30 is provided in a surface of each segment 12 facing the insulator 11. The recess portion 30 has two recess rows 31 extending in the longitudinal direction of the segment 12. Each recess row 31 includes eight first recesses 32, five second recesses 33, and three third recesses 34. The first to third recesses 32 to 34 are arranged in the order from the second end toward the first end of the segment 12. As shown in FIGS. 3A to 3C, the first to third recesses 32 to 34 are each a triangular recess with an acute angle that is tapered as the distance increases from the surface contacting the insulator 11.

As shown in FIG. 3A, the bottom of the triangular recess is defined as the vertex, and a line passing through the vertex and extending toward the riser 14 (second end) in the longitudinal direction of the segment 12 is defined as a reference line (zero-degree direction). The first recess 32 is formed to extend over an angular range of from 30 to 80 degrees with respect to the reference line. A surface of the first recess 32 at 80 degrees forms an undercut 32a. An undercut shape refers to a shape that makes the opening of a recess project over the bottom of the recess. The distance between the bottom of the first recess 32 and the surface contacting the insulator 11, specifically the depth of the first recess 32 is 30% (0.3 t) of a thickness t of the segment 12.

As shown in FIG. 3B, the second recess 33 is formed to extend over an angular range of from 100 to 150 degrees with respect to the reference line. A surface of the second recess 33 at 100 degrees forms an undercut 33a. The distance between the bottom of the second recess 33 and the surface contacting the insulator 11 is 30% (0.3 t) of the thickness t.

As shown in FIG. 3C, the third recess 34 is formed to extend over an angular range of from 100 to 150 degrees with respect to the reference line. A surface of the third recess 34 at 100 degrees forms an undercut 34a. The distance between the bottom of the third recess 34 and the surface contacting the insulator 11 is 50% (0.5 t) of the thickness t.

Steps of manufacturing the commutator 10 will now be described.

Figure 4A:
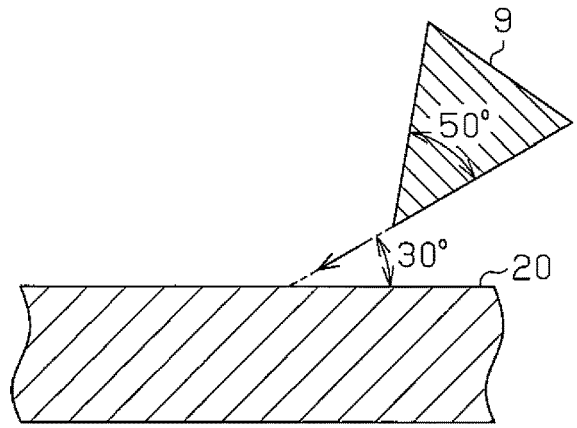
FIGS. 4A to 4C are cross-sectional views showing process of forming the first recess of FIG. 3A.
Figure 4B:
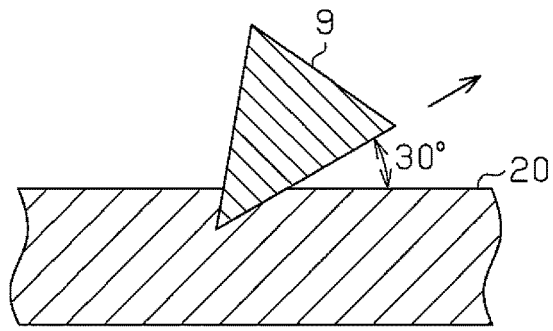
Figure 4C:
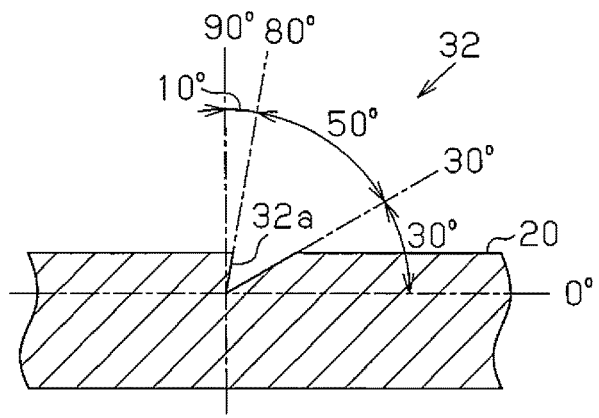

As shown in FIGS. 4A and 4B, a wedged punch 9 of an angle of 50 degrees at its distal end is pressed into a metal plate material 20 at an angle of 30 degrees with respect to a plate surface. Then, the punch 9 is pulled out as shown in FIG. 4C. As a result, the first recess 32 is formed. Although not illustrated, the second and third recesses 33 and 34 are formed in a similar way as the first recess 32, except that the punch 9 is placed at an angle of 150 degrees with respect to the plate surface during the pressing. These steps are repeated to form the recess portion 30 in the metal plate material 20, as shown in FIG. 5.

Figure 5:
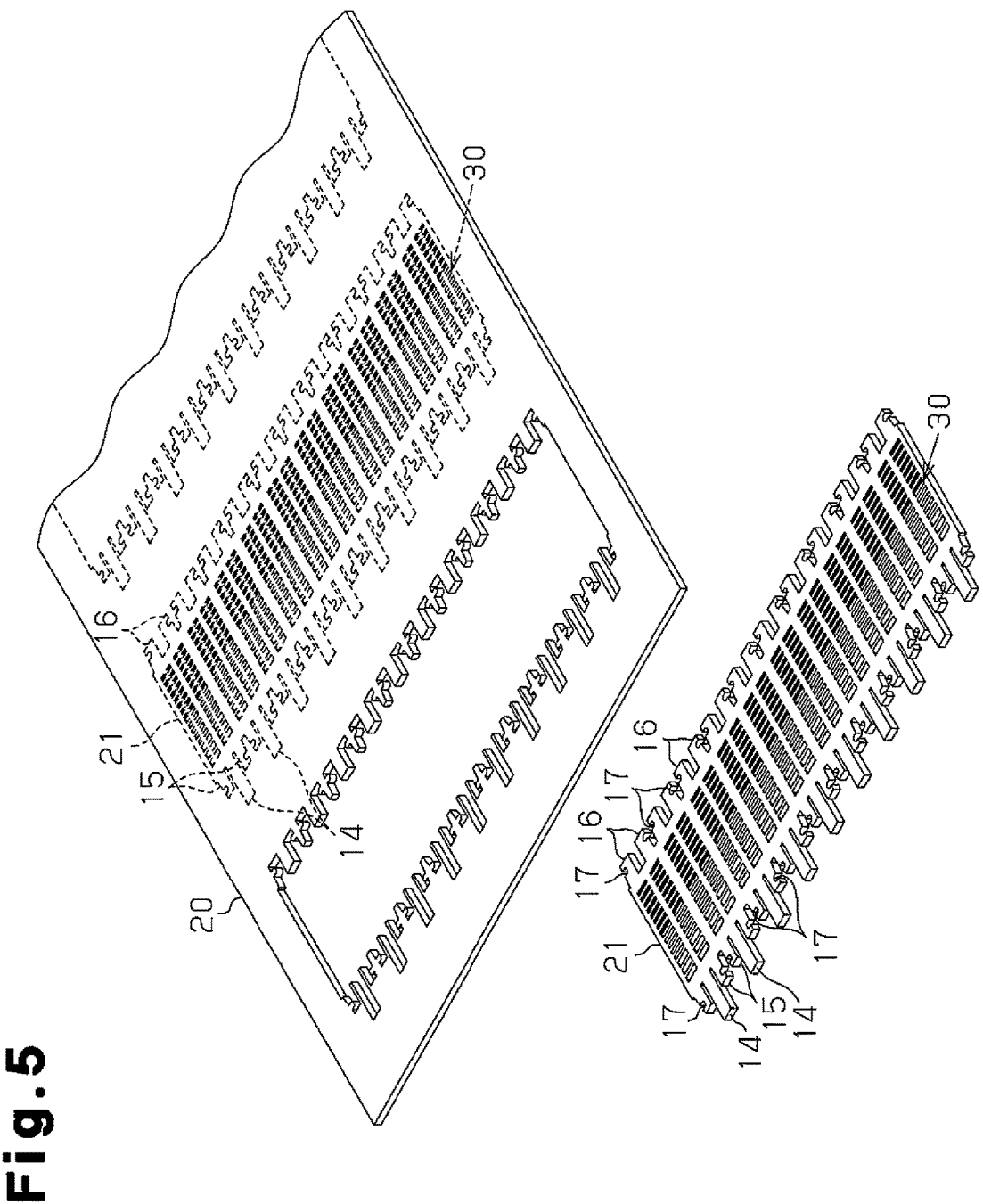
FIG. 5 is a perspective view showing the segment material of FIG. 2.

Next, as shown in FIG. 5, a blank material 21 is punched out of the metal plate material 20, in which the recess portions 30 are formed. The blank material 21 is formed into a substantially rectangular shape. Ten risers 14 and twenty first inner claws 15 are formed at one end of each blank material 21 in the transverse direction (perpendicular to the longitudinal direction). Twenty second inner claws 16 are formed at the opposite end of each blank material 21. The risers 14 are spaced uniformly in the longitudinal direction of the blank material 21. The first inner claws 15 are formed on both sides of each riser 14. The second inner claws 16 are formed at positions corresponding to the positions of the first inner claws 15 in the longitudinal direction of the blank material 21. The first and second inner claws 15 and 16 have the cutouts 17.

Figure 6:
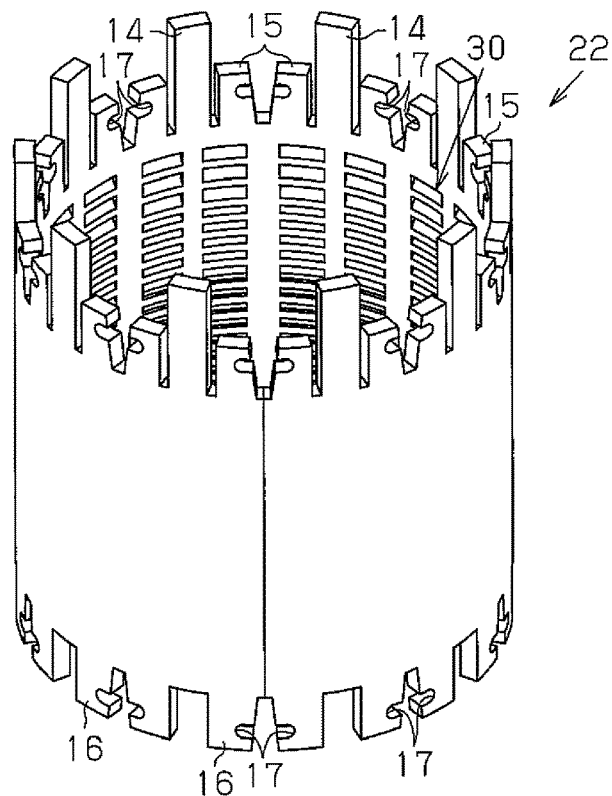
FIG. 6 is a perspective view showing a cylindrical material formed out of the material of FIG. 5.

Next, the blank material 21 is rolled up such that the recess portions 30 face inward in the radial direction, thereby forming a cylindrical material 22 shown in FIG. 6. At this stage, the risers 14, and the first and second inner claws 15 and 16 linearly extend parallel to the axis of the cylindrical material 22.

Then, as shown in FIG. 7, each riser 14 is bent outward in the radial direction such that the distal end of each riser 14 faces a central portion of the cylindrical material 22 in the axial direction. Further, the first and second inner claws 15 and 16 are bent inward in the radial direction such that the respective distal ends of the first and second inner claws 15 and 16 face the central portion of the cylindrical material 22 in the axial direction.

Next, a thermosetting plastic is poured into the cylindrical material 22 by using a die (not shown). After the pouring, the plastic is chemically reacted to be cured, thereby forming the insulator 11 shown in FIG. 1.

Next, the partition grooves 13 (see FIG. 1) are formed at multiple places of the outer circumferential surface of the cylindrical material 22 integral with the insulator 11 to extend in the axial direction. As a result, the cylindrical material 22 is cut into the ten segments 12 electrically isolated from each other, thereby completing the commutator 10 of FIG. 1.

Operation of the commutator 10 will now be described.

As shown in FIG. 2, a recess portion 30 is formed in a surface of the segment 12 that contacts the insulator 11. As shown in FIGS. 4A to 4C, the recess portion 30 is formed by pressing. Thus, formation of the recess portion 30 involves a small number of steps. Forming the recess portion 30 in the segment 12 increases the area of engagement between the segment 12 and the insulator 11, compared to the case where the recess portion 30 is not formed. This increases the force of engagement (catching force) between the segment 12 and the insulator 11.

As shown in FIGS. 3A to 3C, the first to third recesses 32 to 34 forming the recess portion 30 have the undercuts 32a to 34a, respectively. The undercut 32a is formed on a surface at 80 degrees. The undercuts 33a and 34a are formed on surfaces at 100 degrees. Thus, a contact surface between the segment 12 and the insulator 11 at the undercut 32a is at an angle different from the angle thereof at the undercuts 33a and 34a. Specifically, the undercut 32a tilts in a different direction from the undercuts 33a and 34a. When the commutator 10 rotates, centrifugal force acting outward in the radial direction of the insulator 11 (90-degree direction) is applied to the segment 12. If it came off the insulator 11, the segment 12 would be displaced along the undercuts 32a to 34a. Specifically, the segment 12 would be displaced toward an end closer to the riser 14 at a contact area with the undercut 32a, whereas it would be displaced toward an end opposite the end closer to the riser 14 at areas contacting the undercuts 33a and 34a. Thus, in response to application of centrifugal force to the segment 12, all areas of the segment 12 would move in different directions in the longitudinal direction by the presence of the undercuts 32a to 34a. Forces on these areas act in different directions, so that these forces cancel each other out. As a result, the force of engagement between the segment 12 and the insulator 11 is increased.

Further, as shown in FIGS. 3A to 3C, the depth of the third recess 34 (0.5 t) is greater than the depths of the first and second recesses 32 and 33 (0.3 t). This makes the segment 12 and the insulator 11 engage each other at the third recess 34 in an amount greater than amounts observed at the first and second recesses 32 and 33. In other words, the amount of the plastic of the insulator 11 engaged at the undercut 34a is greater than the amounts engaged at the undercuts 32a and 33a. This relatively increases the force of engagement between the segment 12 and the insulator 11 in the area where the third recess 34 is formed. Meanwhile, the areas where the first and second recesses 32 and 33 are formed make sliding contact with brushes (not shown) when the commutator 10 rotates. The small depths of the first and second recesses 32 and 33 make the segment 12 thick in the areas where these recesses are formed. Thus, the insulator 11 is not exposed even if these areas are worn to some extent. This allows the commutator 10 to achieve its function over an extended period of time. As described above, in the commutator 10 of the present embodiment, the segment 12 is less likely to come off the insulator 11 than in the case where a recess (third recess 34) formed in an area that will not be worn is substantially the same in depth as a recess (first and second recesses 32 and 33) formed in an area that will be worn. Additionally, the lifetime of the commutator is extended.

As described in detail above, the first embodiment achieves the following advantages.

(1) The segment 12 is provided with the recess portion 30 having the undercuts 32a to 34a. The recess portion 30 is formed by pressing, which can be conducted easily. Thus, the force of engagement between the segment 12 and the insulator 11 is increased, compared to the case where recesses are not formed. As a result, even if the commutator 10 rotates at high speed, the segment 12 is unlikely to come off the insulator 11.

(2) The first to third recesses 32 to 34 forming the recess portion 30 have the undercuts 32a to 34a, respectively. Centrifugal force acting on each segment 12 when the commutator 10 rotates is divided into a component acting in a direction along the undercuts 32a to 34a and a component acting in a direction perpendicular to the undercuts 32a to 34a. Of these components, only the component acting in the direction along the undercuts 32a to 34a acts to separate the segment 12 and the insulator 11 from each other. The magnitude of this component is smaller than that of the centrifugal force. Thus, the segment 12 is less likely to come off the insulator 11 than in the case where the first to third recesses 32 to 34 do not have the undercuts 32a to 34a.

(3) The recess portion 30 is provided between the first inner claws 15 and the second inner claws 16. This increases the area of engagement between the segment 12 and the insulator 11 at a central portion of the segment 12 in the longitudinal direction, compared to the case where the recess portion 30 is not formed. Thus, the segment 12 is unlikely to come off the insulator 11.

(4) The undercut 32a tilts in a different direction from the undercuts 33a and 34a. Thus, when the commutator 10 rotates, the segment 12 would be displaced in the direction of the tilt of the undercut 32a at the area contacting the undercut 32a, whereas it would be displaced in the direction of the tilts of the undercuts 33a and 34a at the areas contacting the undercuts 33a and 34a. Thus, the forces acting to displace the segment 12 in different directions cancel each other out. As a result, the force of engagement between the segment 12 and the insulator 11 is increased, so that the segment 12 is unlikely to come off the insulator 11.

(5) The third recess 34 provided in an area of the segment 12 facing the riser 14 in the radial direction is formed to be deeper than the first and second recesses 32 and 33 formed in different areas of the segment 12. This increases the area of engagement between the segment 12 and the insulator 11, compared to the case where all these recesses are formed to the same depth. As a result, the segment 12 is unlikely to come off the insulator 11. The riser 14 is connected to the armature coil, so that the area facing the riser 14 does not make sliding contact with the brushes. Hence, this area is not worn, and therefore the thickness of the area is not reduced. As a result, the lifetime of the commutator 10 is not shortened even though the third recess 34 in this area is formed deeper than the first and second recesses 32 and 33 formed in different areas.

Second Embodiment

A second embodiment of the commutator will now be described. The second embodiment mainly differs from the first embodiment in a first inner claw. Like or the same reference numerals are given to those components that are like or the same as the corresponding components of the first embodiment, and detailed explanations are omitted.

Figure 10:
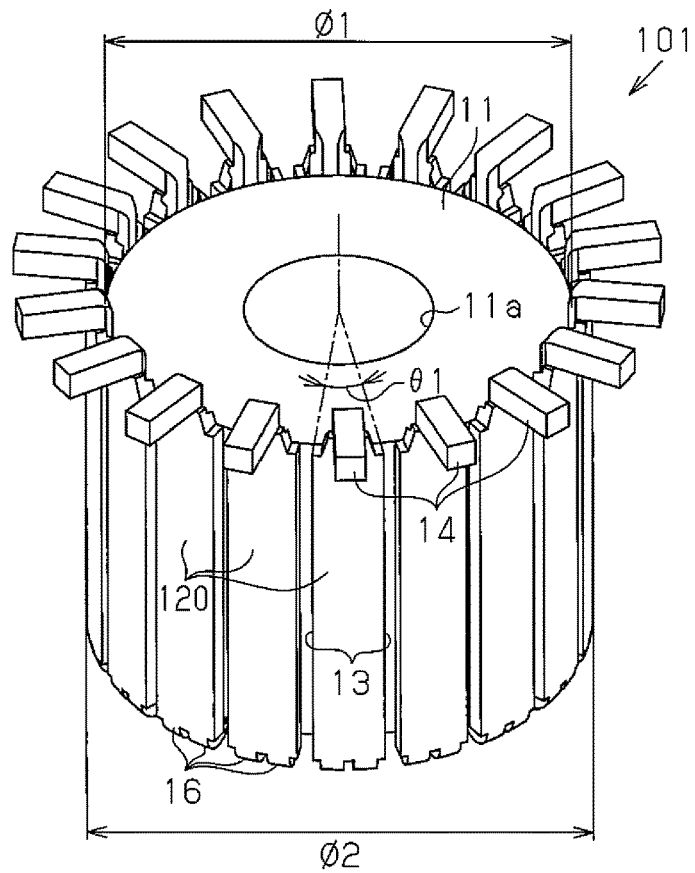
FIG. 10 is a perspective view showing a commutator of a second embodiment.

As shown in FIG. 10, a commutator 101 includes a cylindrical insulator 11, and eighteen segments 120 fixed to the outer circumferential surface of the insulator 11. The eighteen segments 120 are uniformly spaced angularly in the circumferential direction. The segments 120 each occupy an angle θ1 in the circumferential direction. Except for risers 14, second inner claws 16, and first inner claws 121, which will be described below, the eighteen segments 120 together have an inside diameter φ1 and an outer diameter φ2. Specifically, parts of the eighteen segments 120 excluding their risers 14, the second inner claws 16, and the first inner claws 121, which will be described below, form a segment assembly having the inside diameter φ1 and the outer diameter φ2.

Figure 11:
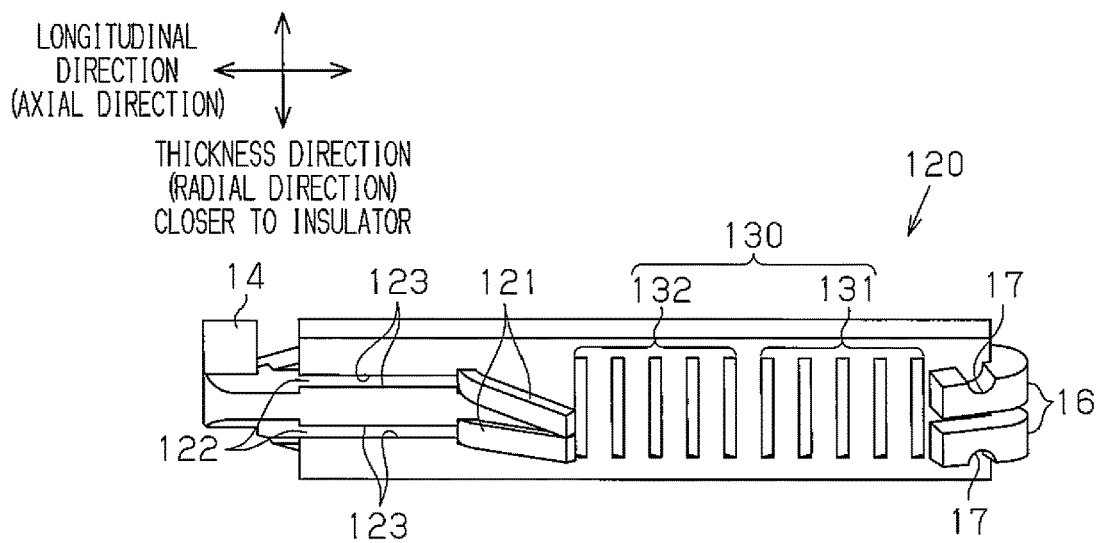
FIG. 11 is a perspective view showing a segment material of the commutator of FIG. 10.

As shown in FIG. 11, a surface of each segment 120 facing the insulator 11 has two first inner claws 121 and a recess portion 130. In the longitudinal direction of the segment 120, the two first inner claws 121 are arranged closer to the riser 14, and the recess portion 130 is arranged closer to the second inner claws 16. The two first inner claws 121 are arranged side by side in the circumferential direction.

The two first inner claws 121 are formed by forming cuts in the radially inner surface of the segment 120, raising the cuts, and bending the cuts at their proximal ends toward the second inner claws 16. This makes distal ends of the two first inner claws 121 face the radially inner surface of the segment 120 and more precisely, face the recess portion 130.

Thus, the two first inner claws 121 are buried in the insulator 11 together with distal ends of the two second inner claws 16. This couples each segment 120 to the insulator 11. Accordingly, the first inner claws 121 correspond to engagement claws.

As a result of formation of the two first inner claws 121, two resultant grooves 122 are formed in the radially inner surface of each segment 120 to extend in the longitudinal direction of the segment 120. The two resultant grooves 122 are arranged side by side in the circumferential direction.

As shown in FIGS. 20 and 21, undercuts 124 are formed on each side wall of an opening 123 of each resultant groove 122. The undercuts 124 project toward each other in the circumferential direction of the insulator 11.

As shown in FIG. 11, the recess portion 130 includes five first recesses 131 and five second recesses 132. The five first recesses 131 are arranged closer to the second inner claws 16 and the five second recesses 132 are arranged closer to the riser 14. The first and second recesses 131 and 132 have the same structures as those of the first and second recesses 32 and 33 of the first embodiment shown in FIGS. 3A to 3C, thus they will not be described in detail.

A cutting punch 140 and a scraping punch 150 used in manufacture of the commutator 101 will now be described.

Figure 12:
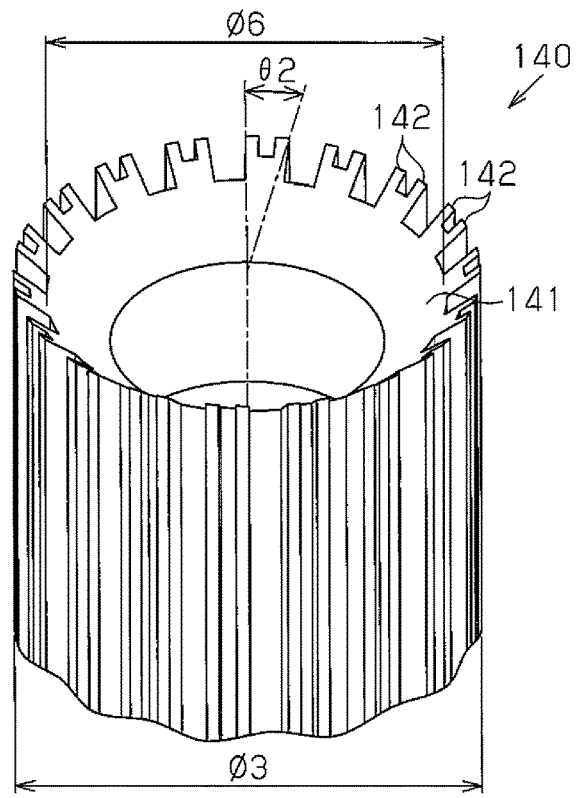
FIG. 12 is a perspective view showing a cutting punch used in manufacture of the commutator of FIG. 10.

As shown in FIG. 12, the cutting punch 140 includes a cylindrical portion 141, and cutting blades 142 in eighteen groups provided on the outer circumferential surface of the cylindrical portion 141 and extending coaxially with the cylindrical portion 141.

The cylindrical portion 141 has an outer diameter φ6 smaller than the inside diameter φ1 of the segment assembly composed of the eighteen segments 120 (φ6<φ1).

Each group of the cutting blades 142 includes two cutting blades. The cutting blades 142 in eighteen groups are arranged side by side and spaced uniformly in an annular pattern. These thirty-six cutting blades 142 form a cutting blade assembly having an outer diameter φ3 larger than the inside diameter φ1 of the segment assembly and smaller than the outer diameter φ2 of the segment assembly (φ1<φ3<φ2).

An end of the cutting punch 140 that is inserted into a cylindrical material 161 (upper end of FIG. 12 and lower end of FIG. 17B), which will be described below, has a conical shape with the radially outer edge having sharpened shape. In other words, part of the cutting punch 140 forming its outer diameter projects in the axial direction relative to the inner diameter portion.

The facing surfaces of the two cutting blades 142 in each group are separated from each other in the circumferential direction, whereas the surfaces of these blades 142 not facing each other form an angle θ2, which is smaller than the angle θ1 occupied by one segment 120 (θ2<θ1).

Figure 13:
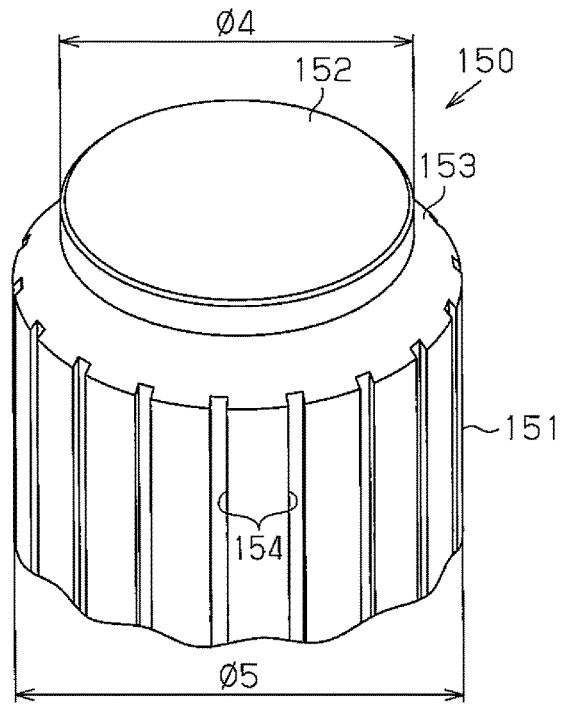
FIG. 13 is a perspective view showing a scraping punch used in manufacture of the commutator of FIG. 10.

As shown in FIG. 13, the scraping punch 150 includes a columnar scraping portion 151, a columnar pressing and bending portion 152 coaxial with the scraping portion 151, and a connecting portion 153 connecting the scraping portion 151 and the pressing and bending portion 152.

The scraping portion 151 has a diameter φ5 larger than the inside diameter φ1 of the segment assembly and smaller than the outer diameter φ3 of the cutting punch 140 (or cutting blade assembly) (φ1<φ5<φ3). Eighteen escape grooves 154 extending in the axial direction are formed in the scraping portion 151 while being uniformly spaced angularly.

The pressing and bending portion 152 has an outer diameter φ4 smaller than the inside diameter φ1 of the segment assembly (φ4<φ1).

To smoothly connect the outer surface of the scraping portion 151 to the outer surface of the pressing and bending portion 152, the connecting portion 153 is formed into a tapered shape with a gradually decreasing outer diameter toward the pressing and bending portion 152.

Steps of manufacturing the commutator 101 using the cutting punch 140 and the scraping punch 150 will now be described. Steps of manufacturing the recess portion 130 is the same as those of manufacturing the recess portion 30 of the first embodiment, thus they will not be described.

Figure 14:
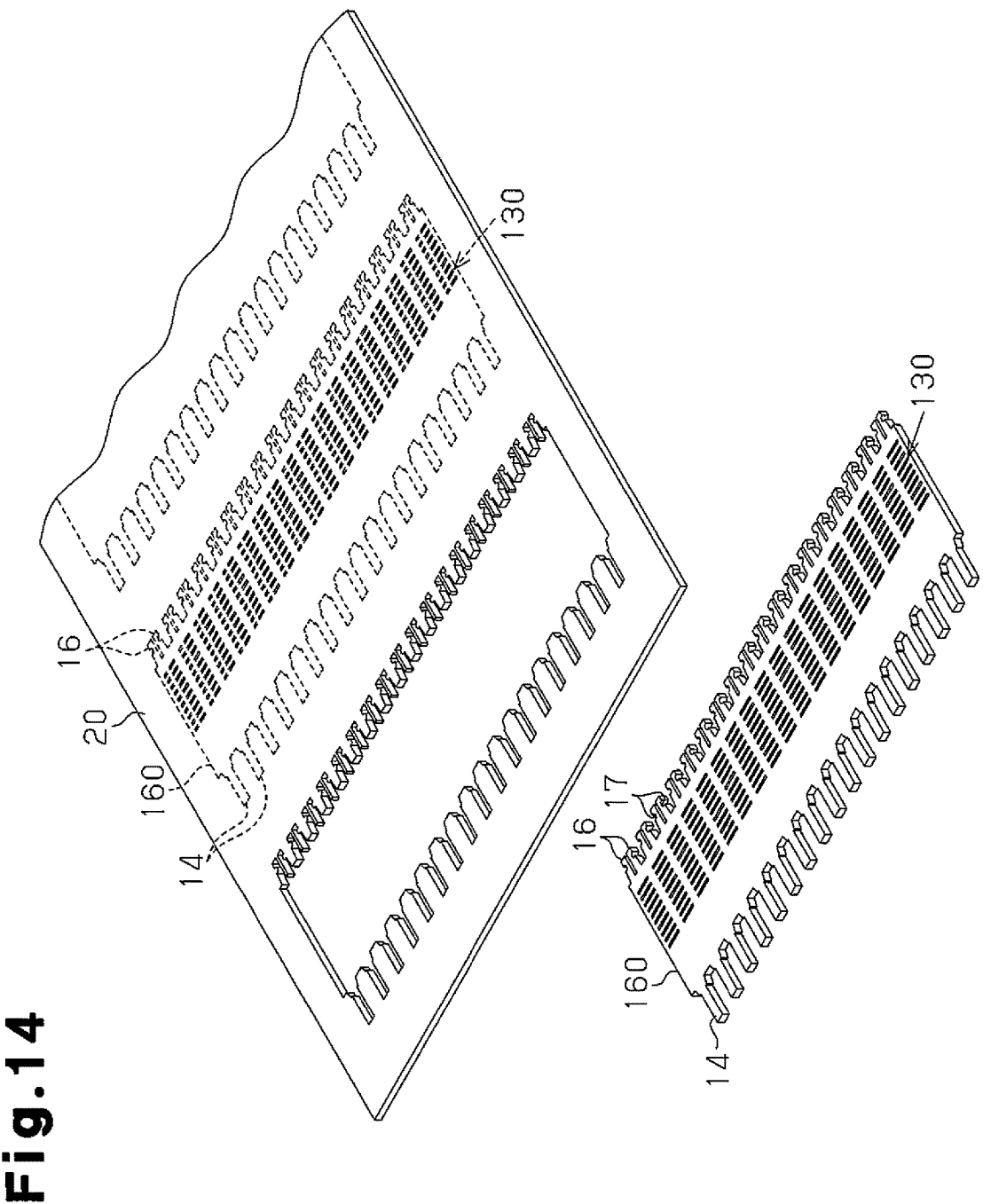
FIG. 14 is a perspective view showing the segment material of FIG. 11.

As shown in FIG. 14, a blank material 160 is punched out of a metal plate material 20. The blank material 160 is formed into a substantially rectangular shape. The eighteen risers 14 are formed at one end of each blank material 160 in the transverse direction (perpendicular to the longitudinal direction), whereas the thirty-six second inner claws 16 are formed at the opposite end of each blank material 160.

The risers 14 are spaced uniformly in the longitudinal direction of the blank material 160. The second inner claws 16 are formed to sandwich a position that faces each riser 14 there between in the longitudinal direction of the blank material 160. The second inner claws 16 have cutouts 17.

Figure 15:
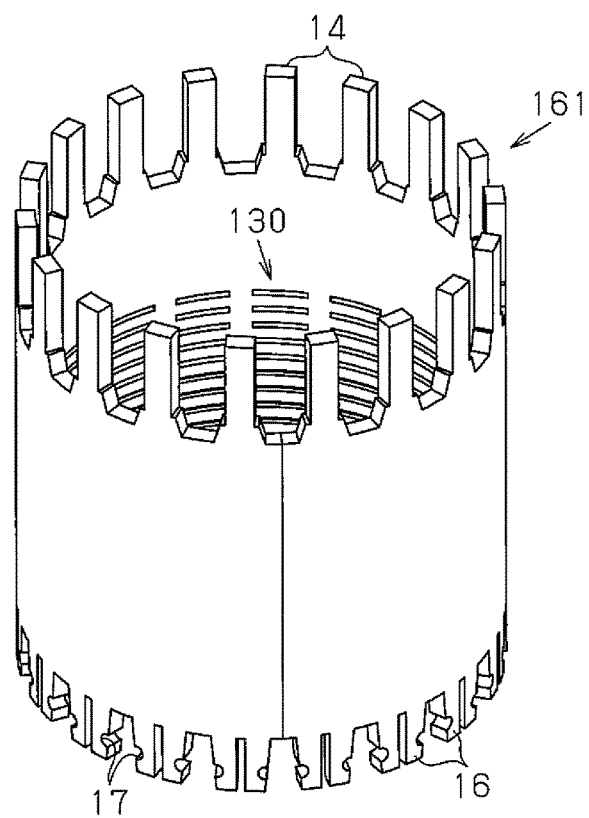
FIG. 15 is a perspective view showing a cylindrical material formed out of the material of FIG. 14.

Next, the blank material 160 is rolled up such that the recess portion 130 faces inward in the radial direction, thereby forming the cylindrical material 161 shown in FIG. 15. The risers 14 and the second inner claws 16 extend linearly parallel to the axis of the cylindrical material 161.

Figure 16:
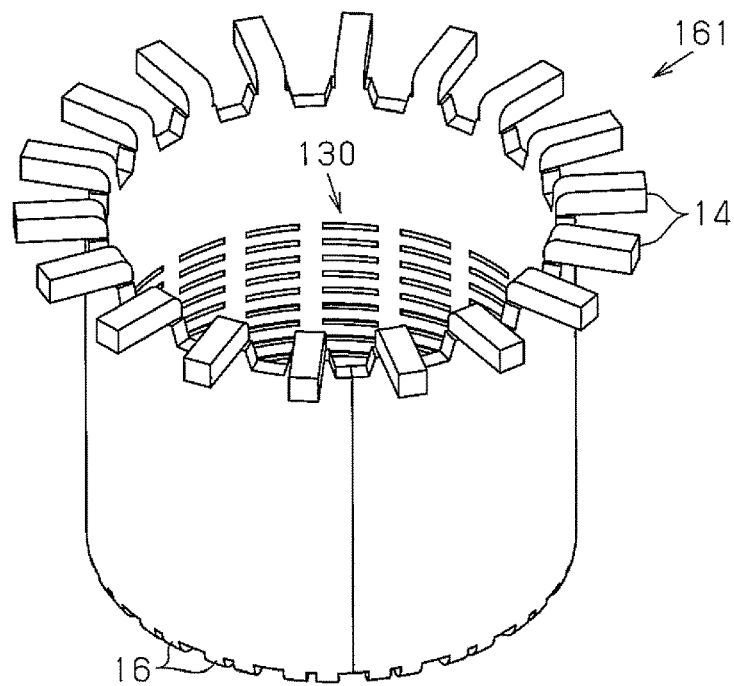
FIG. 16 is a perspective view showing a condition where risers and second inner claws of the cylindrical material of FIG. 15 are bent.

Next, as shown in FIG. 16, each riser 14 is bent radially outward. Further, the second inner claws 16 are bent inward in the radial direction such that the distal ends of the second inner claws 16 face a central portion of the cylindrical material 22 in the axial direction.

Figure 17A:
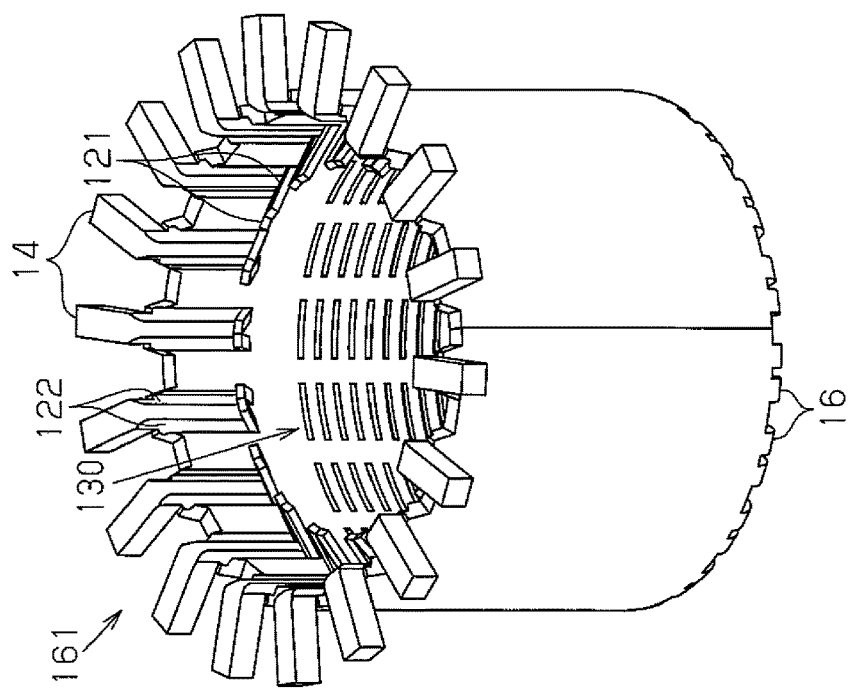
FIG. 17A is a perspective view showing the cylindrical material of FIG. 16 in a condition after the cutting punch of FIG. 12 is inserted in the cylindrical material.
Figure 17B:
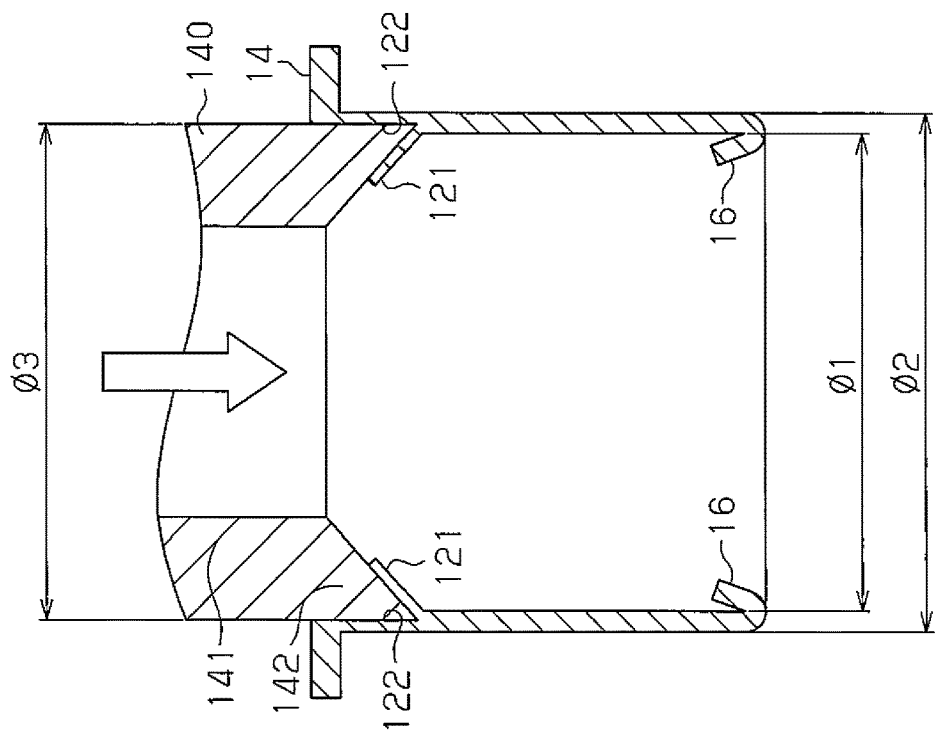
FIG. 17B is a cross-sectional view showing the cylindrical material of FIG. 16 in a condition where the cutting punch of FIG. 12 is placed in the cylindrical material.

Next, as shown in FIG. 17B, the cutting punch 140 is inserted into the cylindrical material 161 from an end near the risers 14. The cutting punch 140 is inserted into the cylindrical material 161 such that the two cutting blades 142 in each group sandwich each riser 14 there between as viewed from the center of the cylindrical material 161.

Then, the cutting punch 140 forms cuts in the inner surface of the cylindrical material 161 and raises these cuts, thereby forming the thirty-six first inner claws 121 as shown in FIGS. 17A and 17B. This forms the thirty-six resultant grooves 122 in the inner surface of the cylindrical material 161 as counterparts of the thirty-six first inner claws 121. The cutting punch 140 forms cuts in the surface and raises these cuts. Thus, as shown in FIG. 19, the opposite side walls of the opening 123 of each of the thirty-six resultant groove 122 bulge radially inward from the inner surface of the cylindrical material 161.

Figure 18B:
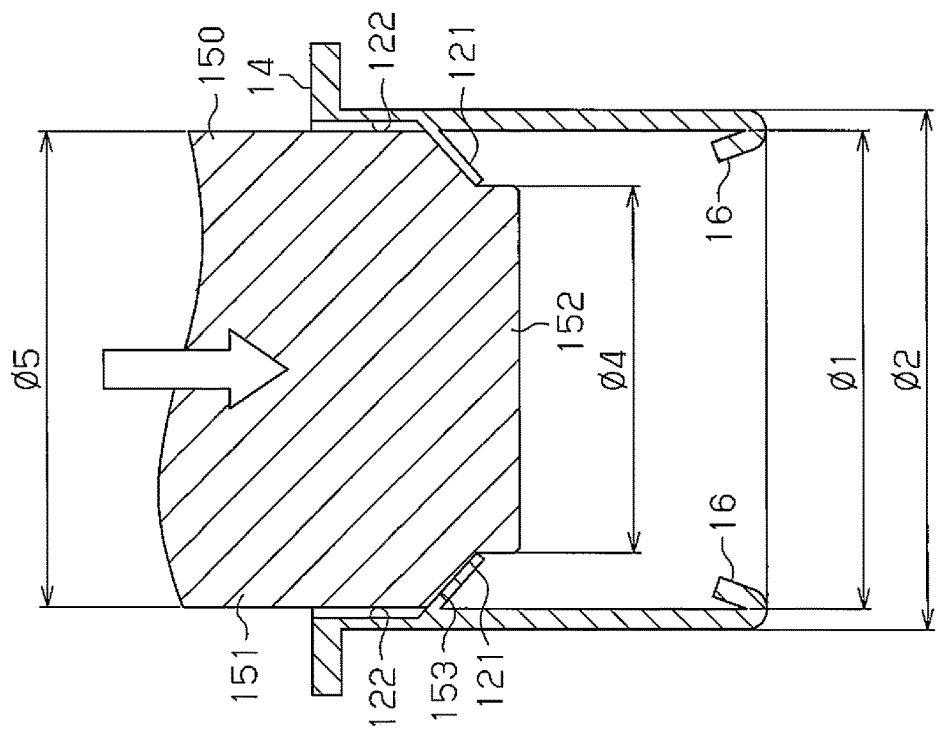
FIG. 18B is a cross-sectional view showing the cylindrical material of FIG. 17A in a condition where the scraping punch of FIG. 13 is placed in the cylindrical material.

Next, the cutting punch 140 is removed from the cylindrical material 161. Then, the scraping punch 150 is inserted into the cylindrical material 161 from the end near the risers 14 as shown in FIG. 18B. The scraping punch 150 is inserted into the cylindrical material 161 such that the escape grooves 154 (see FIG. 13) do not overlap the resultant grooves 122 as viewed from the center of the cylindrical material 161. In the escape grooves 154, the outer circumferential surface of the scraping punch 150 does not make sliding motion with the inner circumferential surface of the cylindrical material 161. Specifically, resistance is not generated against sliding motion resulting from insertion of the scraping punch 150, so that the scraping punch 150 is easily inserted.

Figure 18A:
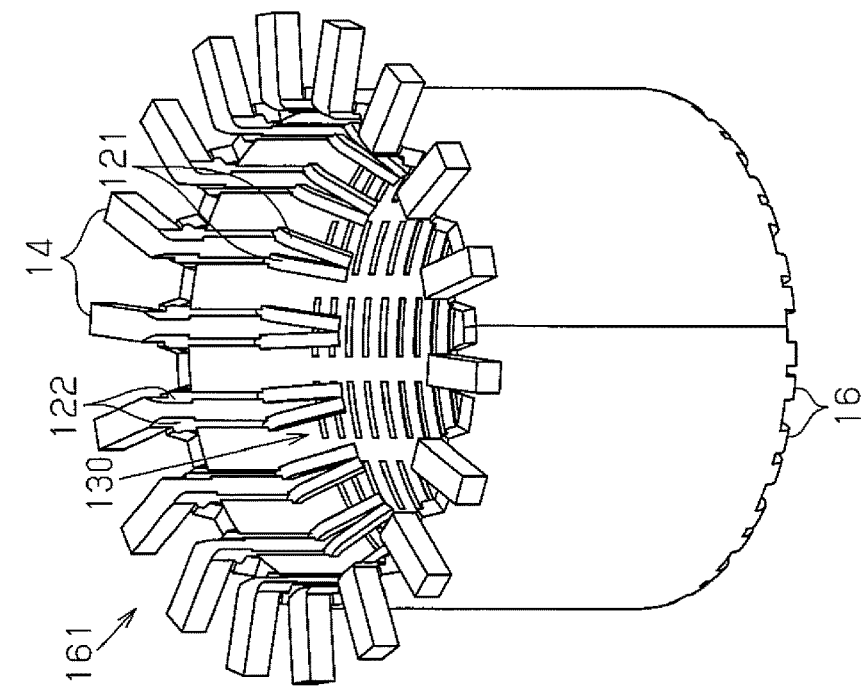
FIG. 18A is a perspective view showing the cylindrical material of FIG. 17A in a condition after the scraping punch of FIG. 13 is inserted in the cylindrical material.

Then, the pressing and bending portion 152 and the connecting portion 153 press the first inner claws 121 to bend the first inner claws 121 radially inward, as shown in FIGS. 18A and 18B. The outer diameter φ5 of the scraping portion 151 is larger than the inside diameter φ1 of the cylindrical material 161 (or segment assembly) and smaller than the outer diameter φ3 of the cutting blade assembly composed of the cutting blades 142. Thus, as shown in FIG. 20, insertion of the scraping portion 151 folds the opposite side walls of the opening 123 of each resultant groove 122, specifically the opposite side walls of each opening 123 having projected in response to the cutting and raising by the cutting punch 140, so that the opening area of this opening 123 is reduced. Specifically, the opposite side walls of the opening 123 facing each other in the circumferential direction are folded to approach each other, thereby forming the undercut 124.

Next, the scraping punch 150 is removed. Then, a thermosetting plastic is poured into the cylindrical material 161 by using a die (not shown). As a result, the thermosetting plastic flows into all the grooves including the resultant grooves 122 as shown in FIG. 21. After the pouring, the plastic is chemically reacted to be cured, thereby forming the insulator 11 shown in FIG. 10.

Next, the partition grooves 13 (see FIG. 10) are formed in multiple places not overlapping the resultant grooves 122 in the outer circumferential surface of the cylindrical material 161 integral with the insulator 11 to extend in the axial direction. As a result, the cylindrical material 161 is cut into the eighteen segments 120 electrically isolated from each other, thereby completing the commutator 101 of FIG. 10.

Operation of the commutator 101 will now be described.

As shown in FIGS. 20 and 21, the undercuts 124 are formed at the openings 123 of the resultant grooves 122. The insulator 11 composed of the cured thermosetting plastic fills the resultant grooves 122, so that the undercuts 124 achieve the anchor effect. This increases the force of engagement between the segment 120 and the insulator 11.

In each segment 120 formed by cutting the cylindrical material 161, the partition groove 13 does not overlap the resultant groove 122. Thus, as shown in FIG. 21, the openings of the resultant grooves 122 are not continuous with an edge of the segment 120 in the circumferential direction of the insulator 11. This allows formation of the undercuts 124 at both openings 123 of the resultant grooves 122 arranged in the circumferential direction of the insulator 11. As a result, force of engagement between the segment 120 and the insulator 11 is increased.

As described in detail above, the second embodiment achieves the following advantages in addition to the advantages of the first embodiment.

(6) The first inner claws 121 are formed by forming cuts in an inner surface of the segment 120 facing the insulator 11 and raising the cuts. The undercuts 124 are formed at the openings 123 of the resultant grooves 122 resulting from forming and raising the cuts in the surface facing the insulator 11. The insulator 11 composed of the cured thermosetting plastic fills the resultant grooves 122. This achieves anchor effect, so that the force of engagement between the segment 120 and the insulator 11 is increased.

(7) In each segment 120 formed by cutting the cylindrical material 161, the partition groove 13 does not overlap the resultant groove 122. Thus, the openings of the resultant grooves 122 are not continuous with an edge of the segment 120 in the circumferential direction of the insulator 11. This allows formation of the undercuts 124 at both openings 123 of the resultant grooves 122 arranged in the circumferential direction of the insulator 11. As a result, force of engagement between the segment 120 and the insulator 11 is increased, compared to the case where an undercut cannot be formed at at least one of these openings.

Each of the aforementioned embodiments may be modified as follows.

Figure 8A:
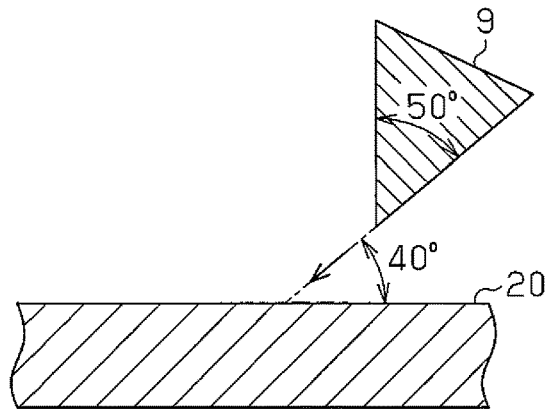
FIGS. 8A to 8D are cross-sectional views showing process of forming a different recess.
Figure 8B:
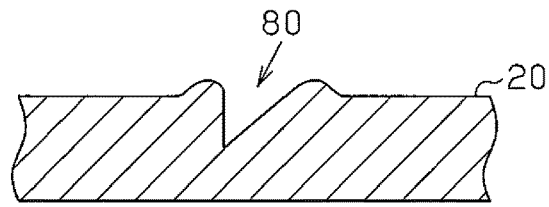
Figure 8C:
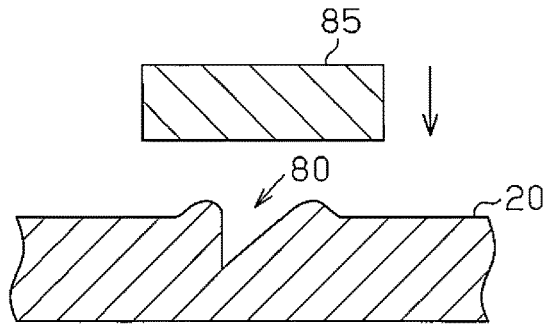
Figure 8D:
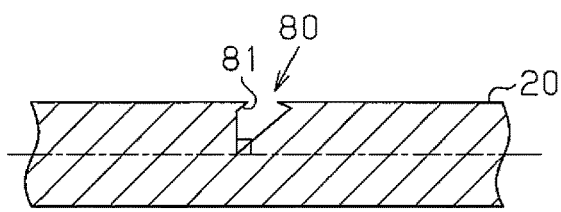

In the first and second embodiments, an undercut may be formed as follows. As shown in FIG. 8A, the wedged punch 9 is pressed into the metal plate material 20 at an angle of 40 degrees with respect to a plate surface. Then, the wedged punch 9 is pulled out of the metal plate material 20. As a result, a recess 80 is formed and the plate surface projects in an area surrounding the recess 80 as shown in FIG. 8B. Next, as shown in FIG. 8C, a dice-shaped punch 85 greater in width than the recess 80 is pressed into the metal plate material 20 in the direction of the thickness of the metal plate material 20. This folds the projecting area surrounding the recess 80, and the folded area forms an undercut 81 as shown in FIG. 8D.

Figure 9A:
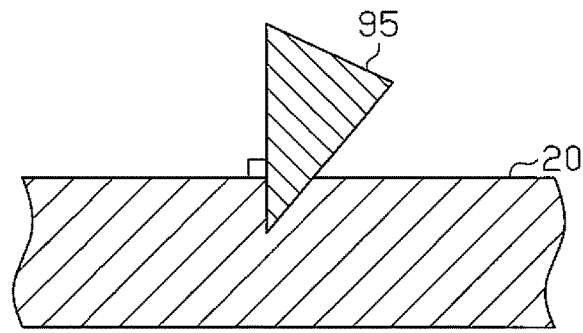
FIGS. 9A to 9C are cross-sectional views showing process of forming a different recess.
Figure 9B:
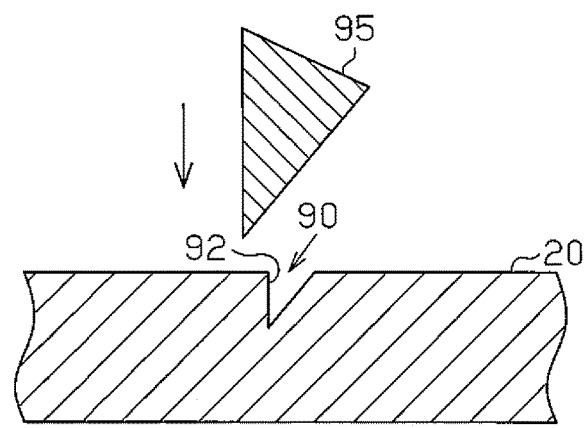
Figure 9C:
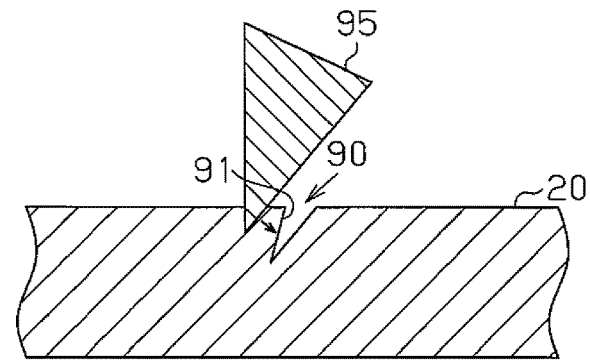

An undercut may also be formed as follows. As shown in FIG. 9A, a wedged punch 95 is pressed into the metal plate material 20 at a right angle (90 degrees) with respect to a plate surface. Then, the wedged punch 95 is pulled out of the metal plate material 20. As a result, a recess 90 with a vertical surface 92 is formed as shown in FIG. 9B. Next, as shown in FIG. 9C, the punch 95 is pressed into an area near the vertical surface 92 of the resultant recess 90. This folds the vertical surface 92 of the recess 90, and the area that has been the vertical surface 92 forms an undercut 91. An undercut formed by the steps shown in FIGS. 8A to 8D and FIGS. 9A to 9D achieves the same advantages as those of the aforementioned embodiments.

Figure 22A:
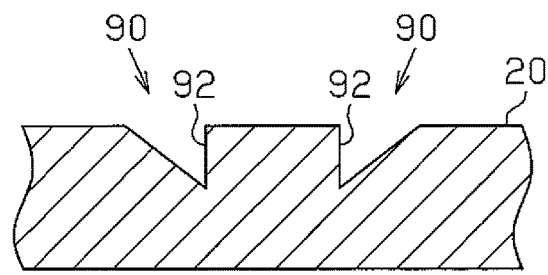
FIGS. 22A to 22C are cross-sectional views showing process of forming a different recess.
Figure 22B:
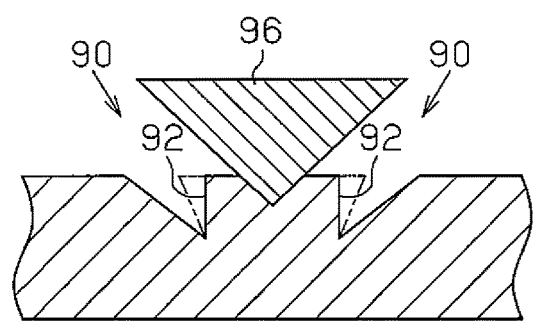
Figure 22C:
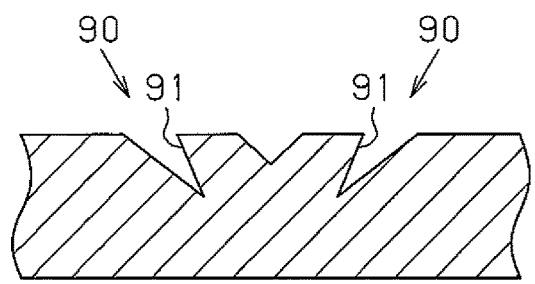

An undercut may also be formed as follows. As shown in FIG. 22A, recesses 90 in a pair are formed with the aforementioned wedged punch 95 such that vertical surfaces 92 in a pair are arranged close to each other. Next, as shown in FIG. 22B, a wedged punch 96 of a different shape is pressed into between the recesses 90 in a pair, specifically between the vertical surfaces 92 in a pair. The wedged punch 96 has a shape that is tapered from its proximal end toward its distal end, which is configured to be pressed into the metal plate material 20. Thus, during the press, the distance between the base end of the punch 96 and each vertical surface 92 becomes longer than the distance between the tip of the punch 96 and the corresponding vertical surface 92. This folds the vertical surfaces 92 of the two recesses 90, and the areas that have been the vertical surfaces 92 form undercuts 91 as shown in FIG. 22C. According to this process, multiple undercuts can be formed simultaneously in a single course of work.

Figure 23A:
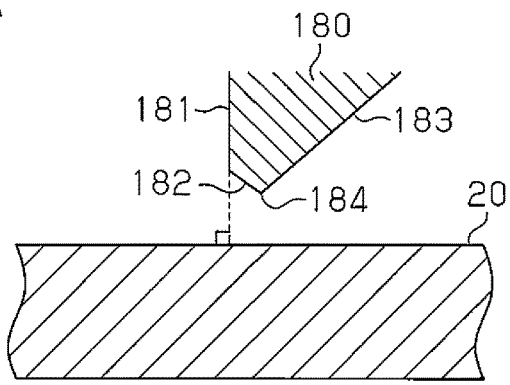
FIGS. 23A to 23D are cross-sectional views showing process of forming a different recess.

An undercut may also be formed with a punch 180 as follows. As shown in FIG. 23A, the punch 180 has a first processing surface 181, a second processing surface 182 continuous with the first processing surface 181, and a third processing surface 183 continuous with the second processing surface 182. A vertex between the second and third processing surfaces 182 and 183 is defined as a processing tip 184. The punch 180 as a whole is tapered toward the processing tip 184.

First, as shown in FIG. 23A, the processing tip 184 of the punch 180 is pressed into the metal plate material 20 such that the first processing surface 181 becomes at a right angle with respect to a plate surface of the metal plate material 20.

Figure 23B:
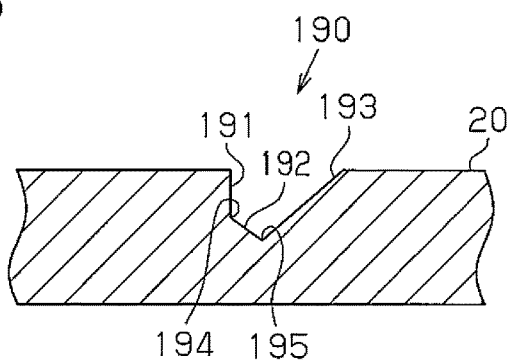

This forms a recess 190 in the metal plate material 20 as shown in FIG. 23B. The recess 190 has a first processed surface 191 corresponding to the first processing surface 181, a second processed surface 192 corresponding to the second processing surface 182, and a third processed surface 193 corresponding to the third processing surface 183. The first processed surface 191 is at a right angle with respect to the plate surface. The recess 190 further has a first processed ridge 194 formed between the first and second processed surfaces 191 and 192, and a second processed ridge 195 formed between the second and third processed surfaces 192 and 193.

Figure 23C:
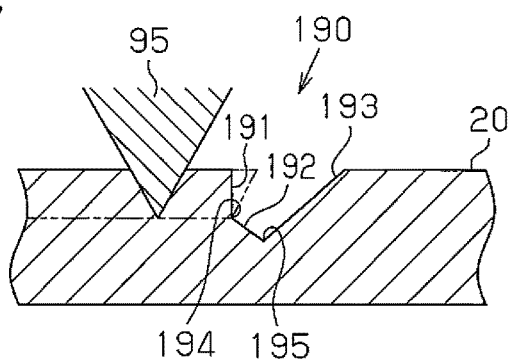

Next, as shown in FIG. 23C, the punch 95 is pressed into an area near the first processed surface 191 of the resultant recess 190. At this time, the punch 95 is pressed such that the distance between the tip of the punch 95 and the plate surface of the metal plate material 20 becomes the same as the distance between the first processed ridge 194 and the plate surface of the metal plate material 20.

Figure 23D:
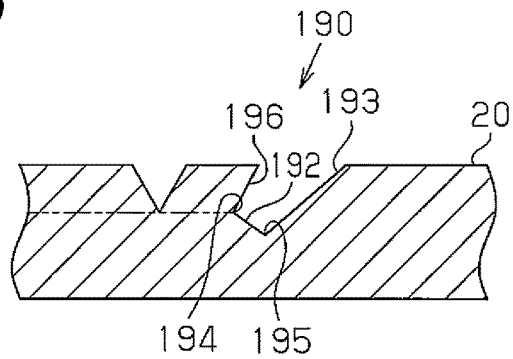

This folds the first processed surface 191 relative to the first processed ridge 194, so that the first processed surface 191, which has been a vertical surface, forms an undercut 196 as shown in FIG. 23D. This process can be conducted easily since it uses a smaller amount of the plate material to be folded from a vertical state, compared to the case where an undercut is formed by the steps shown in FIGS. 8A to 8C.

In the first embodiment, the recess portion 30 has two recess rows 31. The recess portion 30 may also have only one recess row as in the second embodiment or may have three or more recess rows. These achieve the same advantages as those of the first embodiment.

While the two recess rows 31 extend in the longitudinal direction of the segment 12 in the first embodiment, they are not always required to extend in this longitudinal direction.

The third recess 34 is deeper than the first and second recesses 32 and 33 in the first embodiment. However, the third recess 34 may be the same in depth as the first and second recesses 32 and 33. This achieves the same advantages as the advantages (1) to (4) of the first embodiment.

In the first embodiment, the undercuts 32a to 34a may tilt in the same direction. This achieves the same advantages as the advantages (1) to (3) and (5) of the first embodiment. Further, in the second embodiment, undercuts formed at the recess portion 130 may tilt in the same direction.

Although the recess portions 30 and 130 each include multiple recesses in the first and second embodiments, they may each include one or more recesses.

Although two first inner claws 15 and two second inner claws 16 are formed in the first embodiment, only one first inner claw 15 and only one second inner claw 16 may be formed. The first and second inner claws 15 and 16 are not always required to form a pair in the longitudinal direction of the segment 12. One the first and second inner claws 15, 16 may be omitted. Additionally, in the second embodiment, only one first inner claw 121, or three or more first inner claws 121 may be formed.

Although an undercut is formed at each of the first to third recesses 32 and 34 in the first embodiment, it may also be formed at at least one of the first to third recesses 32 to 34.

In the first and second embodiments, the number of the segments 12 is ten and eighteen, respectively. However, the number of the segments 12 is not limited to these numbers and it may be changed as necessary depending on a structure.

In the first embodiment, the cylindrical material 22 is formed by rolling up the blank material 21 punched out of the metal plate material 20 and then the segments 12 are formed by cutting the cylindrical material 22. Alternatively, the segments 12 may be punched directly out of the metal plate material 20.

In the second embodiment, the escape grooves 154 may be omitted from the scraping punch 150.

The invention claimed is:

1. A method of manufacturing a commutator, comprising:
    forming a cylindrical insulator, and
    forming a plurality of commutator pieces about an outer circumferential surface of the insulator, and causing the commutator pieces to be arranged side-by-side in a circumferential direction of the insulator,
    wherein the steps of forming the cylindrical insulator and the plurality of commutator pieces, and causing the commutator pieces to be arranged side-by-side in a circumferential direction of the insulator include the steps of:
    repeatedly pressing a wedge into a substantially flat conductive plate material to form a plurality of recess portions in the conductive plate material, the plurality of recesses defining a first row of recesses aligned in an axial direction and a second row of recesses aligned in the axial direction, the first row displaced from the second row in a longitudinal direction, the first row of recesses and the second row of recesses formed in a same substantially planar surface defined by the conductive plate material, punching a substantially rectangular, flat blank portion from the conductive plate material such that the blank portion includes a plurality of connection claws and engagement claws, the blank portion including the plurality of recess portions, rolling the blank portion to form a unitary cylindrical portion, bending each of the plurality of connection claws such that each of the plurality of connection claws extends radially outward from the unitary cylindrical portion, bending each of the plurality of connection claws such that each connection claw extends outwardly in a radial direction of the unitary cylindrical portion and is configured to be electrically connected to an armature coil, pouring a thermosetting plastic material into the unitary cylindrical portion, using a die, curing the poured thermosetting plastic material by chemical reaction to form the cylindrical insulator to cause each of the engagement claws to be engaged with the cylindrical insulator, and forming a plurality of axial grooves in the unitary cylindrical portion, thereby separating the unitary cylindrical portion into the plurality of commutator pieces, wherein:

each of the plurality of commutator pieces includes a recess portion of the plurality of recess portions, the recess portion including an undercut formed in a surface facing inwardly in the radial direction of the insulator, the recess portion has a first sidewall, a second sidewall and a bottom surface between the first sidewall and the second sidewall, the first sidewall and the second sidewall tilt in a first tilt direction parallel to an axial direction of the insulator, the first sidewall projects over the bottom surface to form the undercut, and the second sidewall tilts more than the first sidewall in the first tilt direction, and a first ridge is formed between the first sidewall and the bottom surface, a second ridge is formed between the second sidewall and the bottom surface, the bottom surface tilts in a second tilt direction opposed to the first tilt direction, and, the second ridge is positioned deeper within the recess portion as compared to the first ridge.

2. The method of manufacturing a commutator according to claim 1, wherein repeatedly pressing the wedge into the conductive plate material to form the plurality of recess portions in the conductive plate material comprises repeatedly pressing the wedge into the conductive plate material to form a first plurality of recess portions in the conductive plate material, such that each under cut is a first undercut having a first tilt direction, and the method further comprises:

repeatedly pressing the wedge into the conductive plate material to form a second plurality of recess portions in the conductive plate material such that each commutator piece further includes a second recess portion, and each of the second recess portions has a second undercut having a second tilt direction different from the first tilt direction.

3. The method of manufacturing a commutator according to claim 1, wherein punching a substantially rectangular, flat blank portion from the conductive plate material such that the blank portion includes a plurality of connection claws and engagement claws comprises punching a substantially rectangular, flat blank portion from the conductive plate material such that each commutator piece includes opposite ends with respect to an axial direction of the insulator, with engagement claws arranged at the opposite ends, and each recess portion is provided between two of the engagement claws with respect to the axial direction of the insulator.

* * * * *